United States Patent [19]

Semar

[11] 4,245,520
[45] Jan. 20, 1981

[54] REVERSING APPARATUS

[75] Inventor: Harold W. Semar, Los Altos, Calif.

[73] Assignee: Westinghouse Electric Corp., Pittsburgh, Pa.

[21] Appl. No.: 853,369

[22] Filed: Nov. 21, 1977

[51] Int. Cl.³ .............................................. F16H 3/14
[52] U.S. Cl. ...................................... 74/377; 192/21; 192/51
[58] Field of Search ................. 74/730, 688, 687, 789, 74/682, 720, 792, 361, 377; 192/21, 51, 53 B, 58 A

[56] References Cited

U.S. PATENT DOCUMENTS

| 170,667 | 12/1875 | Frech | 192/21 |
|---|---|---|---|
| 259,572 | 6/1882 | Moebius | 192/21 |
| 1,493,128 | 5/1924 | Rollag | 74/377 |
| 2,742,981 | 4/1956 | Waldron | 192/58 A X |
| 2,926,550 | 3/1960 | Stoeckicht | 74/789 |
| 3,009,553 | 11/1961 | Henyon | 192/51 X |
| 3,063,529 | 11/1962 | Cook | 192/53 B |
| 3,435,707 | 4/1969 | De Julian | 74/688 |
| 3,478,622 | 11/1969 | Reid | 74/792 |
| 3,481,148 | 12/1969 | Muller et al. | 192/58 A |
| 3,683,719 | 8/1972 | Gros | 74/720 |

FOREIGN PATENT DOCUMENTS 185836  9/1922 United Kingdom ..................... 74/377

Primary Examiner—Allan D. Herrmann
Attorney, Agent, or Firm—F. J. Baehr, Jr.

[57] ABSTRACT

A gear train including an internal gear is combined with a forced synchronized clutch and a hydraulic coupling to form a reversing apparatus for ship propellers.

3 Claims, 1 Drawing Figure

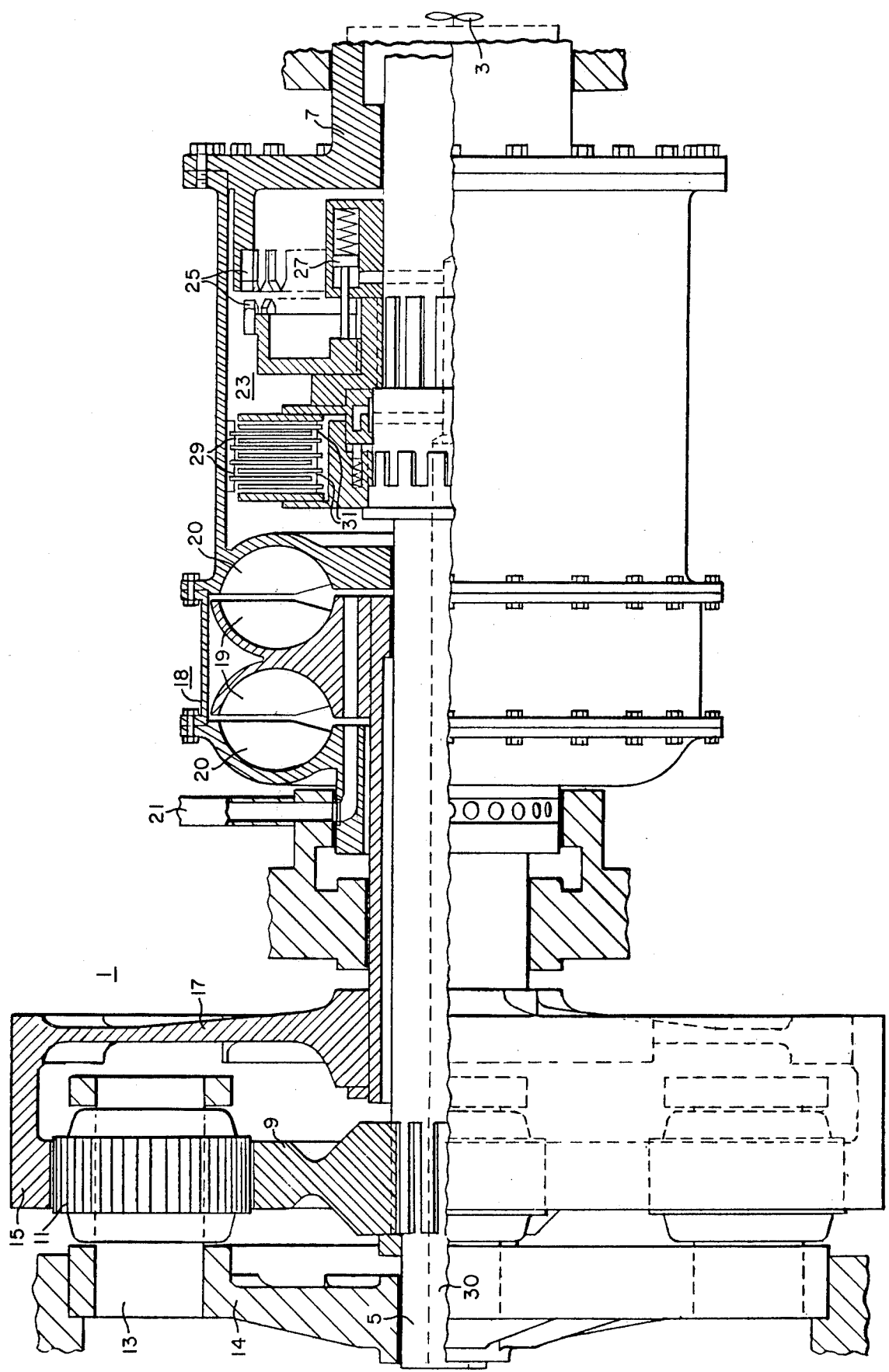

REVERSING APPARATUS

BACKGROUND OF THE INVENTION

This invention relates to reversing apparatus and more particularly to reversing apparatus for reversing the direction of fixed pitch propellers which propel a ship.

Ship propulsion systems require some method of reversing the thrust produced by the propellers in order to slow down, stop and reverse the movement of the ship. Turbine drives often incorporate special blades which can be utilized to reverse the direction in which the turbine rotates. In such instances, reversing apparatus are not required. However, diesel engines, gas turbines, as well as many steam turbines are unidirectional, that is, their direction of rotation is fixed so that gearing or other drives such as variable pitch propellers must be provided to slow down, stop and reverse movement of the ship. The propulsion systems are very large, thousands of horsepower, therefore, the reversing apparatus must be able to transmit large quantities of energy, and be reliable and easy to maintain.

SUMMARY OF THE INVENTION

In general, a reversing apparatus for transmitting power from a prime mover to a propeller of a ship, when made in accordance with this invention, comprises a first shaft connected to the prime mover, a second shaft connected to the propeller, a drive gear affixed to the first shaft, an idler gear meshing with the drive gear and an internal gear meshing with the idler gear. The apparatus also comprises a device for releasably connecting or coupling the first shaft to the second shaft and a device for releasably connecting or coupling the internal gear to the second shaft. Both of the releasable connecting devices cooperate to drive the propeller; in an ahead mode when one of the releasable coupling devices is engaged, and in the astern mode when the other of the releasable coupling devices is engaged.

BRIEF DESCRIPTION OF THE DRAWINGS

The objects and advantages of this invention will become more apparent from reading the following detailed description in connection with the accompanying drawing, in which:

The sole FIGURE is a sectional view of a reversing apparatus made in accordance with this invention.

DESCRIPTION OF THE PREFERRED EMBODIMENT

Referring now to the drawing in detail, there is shown a reversing apparatus 1 for reversing the direction of rotation of a propeller 3 which drives a ship (not shown).

The reversing apparatus 1 comprises a first drive shaft 5 connected to a steam turbine or other prime mover (not shown), and a second drive shaft 7 connected to the propeller 3 through reduction gears (not shown). The second drive shaft 7 is disposed to encircle the first drive shaft 5 and is coaxial therewith.

A drive gear 9 is affixed to the first drive shaft 5 by keyways, shrink fits and/or other means. Idler gears 11 are disposed in engagement with the drive gear 9 and are rotatably disposed on jack shafts 13 affixed to a carrier 14. An internal gear 15 is disposed in engagement with the idler gears 11 and is connected to a spoked hub 17. The gears thus interrelated form a gear train and in the preferred embodiment this train has the reduction ratio greater than 1.

A fluid coupling 18 cooperates with the spoked hub 17 to provide means for releasably connecting the internal gear 15 to the second drive shaft 7. The fluid coupling 18 has vanes 19 and 20 which are, respectively, connected to the hub 17 and the second shaft 7 of the internal gear 15 and first shaft 5 in such a manner that as additional oil is supplied via an oil supply conduit 21, energy is transmitted between the vanes 19 and 20 and the slip or differential speed between the internal gear 15 and the second drive shaft 7 is reduced, and the second drive shaft 7 begins to revolve in the opposite direction reversing the rotation of the propeller 3.

The drive gear 9, idler gears 11, and internal gear 15 cooperate to form a speed reduction train, which is quite suitable for reversing application, as there is no need for the propeller 3 to rotate as fast in the astern mode of operation as in the ahead mode of operation.

A forced synchronized clutch 23, such as one built by Twin Disk, Inc., Racine, Wis., or other means for releasably connecting or coupling the first and second drive shafts 5 and 7 in a slipless union is disposed between these drive shafts 5 and 7. The forced synchronized clutch 23 shown schematically comprises spline members 25, a ram or hydraulic cylinder or other biasing means 27, which operates to engage and disengage the spline members 25; a plurality of disks 29 slidably connected to the second shaft 7 so that the disks 29 move axially with respect to the second shaft 7, but are fixed to rotate therewith; and a plurality of shoes 31 which engage the disks 29 to reduce the slippage between the first and second shafts 5 and 7 and allow the spline members 25 to be brought into engagement by the hydraulic ram 27 as the slippage approaches zero. The ram 27 is actuated by the admission of oil or air under pressure through conduit 30. The ram 27 is interlocked so that it will not force engagement of the splines 25 until the slippage between the first and second shafts 5 and 7 approaches zero.

The operation of the reversing apparatus 1 is as follows. The first drive shaft 5 is driven in one direction, assume clockwise, by a unidirectional prime mover. Power is transmitted through the forced synchronized clutch 23 to the second drive shaft 7 which drives the propeller 3 in the same or clockwise direction. To reverse the rotation of the propeller 3 the forced synchronized clutch 23 is disengaged and hydraulic fluid is supplied to the hydraulic coupling 18. The first drive shaft is still rotating clockwise, however, due to the idler gears 11 the internal gear 15 is rotating in the counterclockwise direction and so are the vanes 19 of the hydraulic coupling 18. The hydraulic fluid transfers energy from the vanes 19 to vanes 20 attached to the second drive shaft, slowing it down, stopping it and then finally reversing the direction of its rotation to counterclockwise, resulting in the propeller reversing to a counterclockwise rotation thus slowing down, stopping and changing the direction of thrust being applied by the propeller so that the ship changes from ahead to astern movement.

The apparatus hereinbefore described meets the reversing requirements of a ship propulsion system having a unirotational prime mover, reduction gearing and fixed pitch propeller. The reduction ratio of the gear train comprising the reversing means is preferably more than one, since there is no need to drive the propeller astern to full ahead speed. Normal maneuvering of the ship, which takes place at low speed, is done by alternately energizing and deenergizing the ahead and astern couplings with the prime mover rotating at a reduced speed. The clutch engagements require moderate energy absorption within the capability of the frictional elements of a conventional forced synchronized clutch. However, "crash stop" maneuvers require the engagement of the astern coupling with high speed differentials necessitating the absorption of large amounts of energy. The hydraulic supply system provides a sufficient heat sink to absorb this energy. Therefore the reversing apparatus hereinbefore described uniquely combines the simple rugged elements to produce a reliable reversing function for a unidirectional ship prime mover.

What is claimed is:

1. A reversing apparatus for transmitting power from a prime mover to a propeller of a ship, said reversing apparatus comprising
    a first shaft connected to said prime mover,
    a second shaft connected to said propeller,
    a drive gear affixed to said first shaft,
    at least one idler gear meshing with said drive gear,
    an internal gear meshing with said idler gear,
    a forced synchronizing clutch connecting said first shaft and said second shaft in positive engagement,
    a fluid coupling connecting said internal gear to said second shaft, and
    a fluid supply for the fluid coupling connecting the internal gear and the second shaft, the fluid supply having a large reservoir which serves as a heat sink for large energy absorption by the fluid coupling,
    said forced synchronizing clutch and fluid coupling cooperating to drive said propeller in an ahead mode when said forced synchronizing clutch is engaged and in an astern mode when said fluid coupling is engaged.

2. The reversing apparatus as set forth in claim 1, wherein the first and second shafts are coaxial and have bearing means disposed therebetween.

3. The reversing apparatus as set forth in claim 1, wherein the gears cooperate to drive the second shaft at a reduced speed when the means releasably connecting the internal gear to the second shaft is engaged.

* * * * *